United States Patent
Mueller et al.

(10) Patent No.: US 7,666,820 B2
(45) Date of Patent: Feb. 23, 2010

(54) BOREHOLE TREATMENT AGENT CONTAINING LOW-TOXIC OIL PHASE

(75) Inventors: Heinz Mueller, Monheim (DE); Nadja Herzog, Korschenbroich (DE); Stephan Von Tapavicza, Erkrath (DE)

(73) Assignee: Emery Oleochemicals GmbH, Dusseldorf (DE)

( * ) Notice: Subject to any disclaimer, the term of this patent is extended or adjusted under 35 U.S.C. 154(b) by 502 days.

(21) Appl. No.: 10/527,212

(22) PCT Filed: Sep. 9, 2003

(86) PCT No.: PCT/EP03/09981

§ 371 (c)(1),
(2), (4) Date: Nov. 28, 2005

(87) PCT Pub. No.: WO2004/029175

PCT Pub. Date: Apr. 8, 2004

(65) Prior Publication Data

US 2007/0142234 A1 Jun. 21, 2007

(30) Foreign Application Priority Data

Sep. 18, 2002 (DE) .............................. 102 43 312

(51) Int. Cl.
*C09K 8/36* (2006.01)
*E21B 21/00* (2006.01)
(52) U.S. Cl. ....................... 507/136; 507/138; 507/905; 175/65
(58) Field of Classification Search ................ 507/136, 507/138, 905; 166/65; 175/65
See application file for complete search history.

(56) References Cited

U.S. PATENT DOCUMENTS

| 4,374,737 A | 2/1983 | Larson et al. |
|---|---|---|
| 5,106,516 A | 4/1992 | Mueller et al. |
| 5,232,910 A | 8/1993 | Mueller et al. |
| 5,252,554 A | 10/1993 | Mueller et al. |
| 5,254,531 A | 10/1993 | Mueller et al. |
| 5,318,954 A * | 6/1994 | Mueller et al. .............. 507/138 |
| 5,318,956 A | 6/1994 | Mueller et al. |
| 5,348,938 A | 9/1994 | Mueller et al. |
| 5,403,822 A | 4/1995 | Mueller et al. |
| 5,441,927 A | 8/1995 | Mueller et al. |
| 5,461,028 A | 10/1995 | Mueller et al. |
| 5,663,122 A | 9/1997 | Mueller et al. |
| 5,755,892 A | 5/1998 | Herold et al. |
| 5,846,601 A | 12/1998 | Ritter et al. |
| RE36,066 E | 1/1999 | Mueller et al. |
| 5,869,434 A | 2/1999 | Mueller et al. |
| 6,022,833 A | 2/2000 | Mueller et al. |
| 6,122,860 A | 9/2000 | Von Tapavicza et al. |
| 6,165,946 A | 12/2000 | Mueller et al. |
| 6,289,989 B1 | 9/2001 | Mueller et al. |
| 6,350,788 B1 | 2/2002 | Herold et al. |
| 6,716,799 B1 | 4/2004 | Mueller et al. |
| 6,806,235 B1 | 10/2004 | Mueller et al. |
| 2003/0144153 A1 | 7/2003 | Kirsner et al. |

FOREIGN PATENT DOCUMENTS

| EP | 0 374 671 | 6/1990 |
|---|---|---|
| EP | 0 374 672 | 6/1990 |
| EP | 0 627 481 | 12/1994 |
| EP | 0 765 368 | 4/1997 |
| EP | 0 787 706 | 8/1997 |
| WO | WO 02/053675 A1 * | 7/2002 |
| WO | WO 03/093392 | 11/2003 |

OTHER PUBLICATIONS

"Fundamental Characteristics of Drilling Fluids", Manual of Drilling Fluid Technology, NL Baroid, 1979, pp. 3-8.
Mueller et al., U.S. Appl. No. 10/566,225, filed Aug. 3, 2006.
Mueller et al., U.S. Appl. No. 10/576,916, filed Mar. 27, 2007.
Mueller et al., U.S. Appl. No. 10/595,280, filed Jan. 18, 2007.
Mueller et al., U.S. Appl. No. 11/631,450, filed Mar. 3, 2008.

* cited by examiner

*Primary Examiner*—Timothy J. Kugel
(74) *Attorney, Agent, or Firm*—Smith Moore Leatherwood LLP

(57) ABSTRACT

The invention relates to a borehole treatment composition containing an aqueous phase and a non-aqueous oil phase, emulsifiers and, where appropriate, further customary additives, the non-aqueous oil phase containing at least one of
a) paraffins having from 5 to 22 carbon atoms; and
b) internal olefins having from 12 to 30 carbon atoms in the molecule; in the form of a blend with
c) carboxylic esters of the formula R—COO—R', where R stands for a linear or branched, saturated or unsaturated alkyl radical having from 15 to 25 carbon atoms and R' denotes a saturated, linear or branched alkyl radical having from 3 to 22 carbon atoms. The ratio of the toxicity of internal olefins of chain length C16/C18 (standard IO) to the toxicity of the constituents of the non-aqueous oil phase, in each case measured by the *Leptocheirus plumulosus* acute, static 96 hour/10 day sediment toxicity test (in accordance with ASTM E 1367-92 & EPA/600/R-94/025, Section 11), is less than 1.

22 Claims, No Drawings

BOREHOLE TREATMENT AGENT CONTAINING LOW-TOXIC OIL PHASE

RELATED APPLICATIONS

This application is filed under 35 U.S.C. § 371 claiming priority from application PCT/EP2003/009981 filed Sep. 9, 2003; claiming priority from German application DE 102 43 312.7 filed Sep. 18, 2002, the entire contents of each application are incorporated herein by reference.

FIELD OF THE INVENTION

The invention relates to borehole treatment compositions which comprise an aqueous phase and an oil phase, this oil phase exhibiting particularly low levels of toxicity towards marine microbiota.

BACKGROUND OF THE INVENTION

Borehole treatment compositions encompass all kinds of auxiliary fluids which can be used when drilling into reserves of petroleum or natural gas. As a characteristic example of such treatment compositions, the invention is described below with reference to drilling fluids and drilling muds based thereon which may be used both with land-sited and with marine wells. The field of use of the inventive modification of auxiliary fluids of the type concerned here, however, is not restricted to these systems. It also embraces the numerous further auxiliary fluids of the field which is addressed here. Examples that may be mentioned include spotting fluids, spacers, packer fluids, auxiliary fluids for workover and stimulation and for fracturing. The invention is directed both to auxiliary fluids of the type stated which are oil-based, i.e. operate with a continuous oil phase, and to auxiliaries in which the oil phase is emulsified in a continuous phase which in particular is aqueous. Drilling fluids and drilling muds based on them are characteristic examples of the various possibilities.

On the one hand, are known water-based drilling muds which have an emulsified oil phase content of approximately 1 to 50%, in addition to the other customary auxiliaries of such a drilling mud, which are also referred to as O/W emulsion muds. On the other hand, oil-based mud systems in which the oil constitutes the flowable phase or else at least a substantial fraction of the flowable phase in the form of a continuous oil phase are in widespread use. Particular importance here attaches to the muds known as invert drilling muds, which on the basis of W/O emulsions comprise a disperse aqueous phase in the continuous oil phase. The amount of disperse aqueous phase is normally in the range from at least about 5 to 10% by weight up to about 50 to 60% by weight. In addition to these W/O invert drilling muds, those referred to as true oil muds are also known, whose liquid phase is composed almost exclusively of a continuous oil phase and which contain small amounts if any—normally not more than about 5 to 10% by weight—of aqueous phase in dispersed form.

The non-aqueous phase of such mud systems is formed by what is called the carrier fluid. This is generally diesel oil, to which certain additives are added to form the actual drilling mud. With the end of the 1980s, however, came the demand for environment-friendly mud systems and hence carrier fluids. These were in particular to be more biodegradable than the diesel oil used beforehand. Alongside various liquid esters, such as those described in EP 0 374 672 A1, for example, olefinic hydrocarbons were investigated for their usefulness. Reference may be made here, by way of example, to the applicant's EP 0 765 368 A1, which is directed to the use of alpha-olefins as carrier fluids.

There nevertheless continues to be a need for novel carrier fluids, since the known compounds frequently cannot be used under all operating conditions or do not meet the increasingly stringent requirements for biodegradability or low toxicity. The latter criterion in particular is becoming increasingly significant, since more and more wells are destined to be sunk in ecologically sensitive regions. This is especially the case with offshore wells, i.e. wells sunk in the ocean floor.

The toxicity of a mud is generally determined by biological tests in which marine microbiota are exposed to the ingredients of the mud at different concentrations. The objective is to find mud systems which meet the physical, technical requirements while being of minimal toxicity to the environment. Mention should also be made at this point of the physical stresses on the drilling muds. The muds are heated at great depths to high temperatures, up to 250° C. or more; high pressures prevail, and at the same time the compounds in the mud both must remain chemically stable and must not exhibit any severe change in their viscosity behaviour, while continuing to form a stable emulsion under the conditions outlined.

It is an object of the present invention to provide borehole treatment compositions, especially drilling muds, which are enhanced both in respect of their performance properties and in respect of environmental compatibility.

BRIEF DESCRIPTION OF THE INVENTION

The present specification accordingly provides borehole treatment compositions comprising an aqueous phase and a non-aqueous oil phase, emulsifiers and, where appropriate, further customary additives, such as weighting agents, fluid loss additives, viscosity regulators, wetting agents, salts, biocides, corrosion inhibitors and/or an alkali reserve, the non-aqueous phase being selected in whole or in part from the group consisting of a) paraffins having from 5 to 22 carbon atoms and/or
b) internal olefins having from 12 to 30 carbon atoms in the molecule in each case in the form of a blend with
c) carboxylic esters of the general formula R—COO—R', where R stands for a linear or branched, saturated or unsaturated alkyl radical having from 15 to 25 carbon atoms and R' denotes a saturated, linear or branched alkyl radical having from 3 to 22 carbon atoms or from mixtures of components a) to c), characterized in that the ratio of the toxicity of internal olefins of chain length C16/C18 (standard IO) to the toxicity of the constituents of the non-aqueous phase, in each case measured by the *Leptocheirus plumulosus* acute, static 96 hour/10 day sediment toxicity test (in accordance with ASTM E 1367-92 & EPA/600/R-94/025, Section 11), is less than 1.

DETAILED DESCRIPTION OF THE INVENTION

Toxicity testing by means of the abovementioned *Leptocheirus* test in accordance with ASTM E 1367 is prescribed by the Environmental Protection Agency (EPA) for drilling fluid systems intended for use in wells in the Gulf of Mexico. In order to make it easier to compare results, the toxicity for a standard compound, namely a mixture of internal olefins of chain lengths C16/C18, is compared with the results for the carrier fluids to be tested. The ratio F (relative toxicity) is determined as follows: F=toxicity (standard)/toxicity (carrier fluid). The muds of the invention comprise oil phases for which the value of F is less than 1, preferably less than 0.5, and in particular cases less than 0.4.

As the toxicity investigations demonstrate, hydrocarbons are extremely critical in respect of the *Leptocheirus plumulosus* results. The table below illustrates this:

| Hydrocarbon compounds used as carrier fluids | F |
|---|---|
| Branched paraffins | 2.7-4.53 |
| LAO C14/16 70:30 | 3.15 |
| Low-tox. mineral oil | 17.41 |
| C16/18 IO | 1.19-1.94 |

The results which show that esters—based on C16-C26 total carbon chains—are able to bring the overall toxicity of mixtures of hydrocarbons with ester into line with the criteria set by the EPA are all the more surprising. Listed below are exemplary mixtures, together with their F values:

| Oil phase | | Mixing ratio | F |
|---|---|---|---|
| Branched paraffin | | | = 2.7 |
| Branched paraffin | + C20-22 = (OMC 586) | 70:30 | = 0.98/0.54 |
| Branched paraffin | + C20-22 = (OMC 586) | 60:40 | = 0.36 |
| Branched paraffin | + C20-22 = (OMC 586) | 50:50 | = 0.37 |
| Branched paraffin | + C21 = (OMC 233) | 50:50 | = 0.37 |
| C16/C18 IO | | | = 2.7 |
| C16/18 IO + C16-18 (OMC 1049) | | 50:50 | = 0.87 |
| C16/18 IO + mix of C16-C18 + C20-22 | | 40:40:20 | = 0.90 |
| C16/C18 IO + C16-C26 blend | | 50:50 | = 0.96 |
| LAO C14/16 70:30 | + C20-22 OMC 586 | 50:50 | = 2.5 |
| Low-tox. mineral oil | + C20-22 OMC 586 | 50:50 | = 2.3 |

OMC586 denotes a 2-ethylhexanol ester based on saturated C8-C14 fatty acids. OMC233 corresponds to an isobutanol ester based on C14-18+C16-18 unsaturated fatty acids. OMC1049 denotes 2-ethylhexyl octanoate. All of the products are from Cognis.

The results show that of the products already used in drilling practice, such as branched paraffins, LAO 14/16, low-tox. mineral oil and IO C16/18, the two products C14/16 LAO and the low-tox. mineral oil (as a result of no acceptable addition of ester) can be brought into line with the data for the EPA reference substance (IO C16/18 from Chevron). This is particularly surprising in respect of LAO, since branched paraffins generally have the greater toxicity. The data show, however, that it is possible, by adding esters or ester mixtures in accordance with the invention, to prepare drilling mud systems based on IO and also liquid paraffins (branched and linear) which achieve a *Leptocheirus* toxicity factor <1.

The oil phases of the systems of the invention comprise components a) and/or b) alone or together in a blend with esters c) and also, where appropriate, in a blend with other suitable oil phases.

Component a)

As component a), use is made in accordance with the invention of linear or branched paraffins having from 5 to 22 carbon atoms. Paraffins more correctly referred to alkanes—are, as is known, saturated hydrocarbons, which for the linear and branched representatives follow the general empirical formula $C_nH_{2n+2}$. The cyclic alkanes follow the general empirical formula $C_nH_{2n}$. Particular preference is given to the linear and branched paraffins, whereas cyclic paraffins are less preferred. The use of branched paraffins is particularly preferred. Also preferred are paraffins which are liquid at room temperature, in other words those having from 5 to 16 carbon atoms per molecule. However, it may also be preferred to use paraffins of 17 to 22 carbon atoms which have a waxlike consistency. It is preferred, however, to use mixtures of the different paraffins, and particularly preferred if these mixtures are still liquid at 21° C. Such mixtures may be formed, for example, from paraffins having from 10 to 21 carbon atoms. As far as the toxicity is concerned, especially in the *Leptocheirus plumulosus* test, the performance of paraffins alone is generally inadequate. Typical F values for paraffins lie between 2.7 and 4.53.

Component b)

As component b) it is possible in accordance with the invention to use internal olefins (abbreviated below to IO). IOs are likewise compounds known per se which can be prepared by any of the processes that are known to the person skilled in the art for that purpose. EP 0 787 706 A1, for example, describes a process for synthesising IOs by isomerising alpha-olefins over sulfonic or persulfonic acids. A characteristic feature is that the IOs thus obtained are linear and contain at least one olefinic double bond which is not in the alpha position in the alkyl chain.

In accordance with the invention it is preferred to use those IOs and IO mixtures which comprise IOs having from 12 to 30 carbon atoms per molecule, preferably having 14 to 24 carbon atoms and in particular having up to 20 carbon atoms per molecule. The olefins used in accordance with the invention preferably contain only one olefinic double bond. In the *Leptocheirus* test, F values of between 1.1 and 2.0 are typically achieved.

Component c)

A further constituent of the oil phases of the invention are esters of the general formula R—COO—R', in which R stands for a linear or branched, saturated or unsaturated alkyl radical having from 15 to 25 carbon atoms and R' denotes a saturated, linear or branched alkyl radical having from 6 to 22 carbon atoms. Esters of this kind are also known chemical compounds. Their use in principle in drilling muds is the subject-matter, for example, of EP-0 374 672 A1 and of EP 0 374 671 A1. The *Leptocheirus* values for esters are typically in the range from 1.5 to 0.2, so that such compounds alone may already be suitable for forming oil phases of low toxicity. However, particular chain lengths must be selected to that end. Particular preference is given to using esters whose radical R stands for a saturated or unsaturated alkyl radical having from 15 to 25 carbon atoms and whose radical R' stands for a saturated alkyl radical having from 3 to carbon atoms. In particular, the saturated compounds here are preferred. In the context of the inventive teaching it is preferred for the oil phase to contain, besides the esters as described above, not more than 15% by weight (based on the oil phase) of other esters having radicals R which stand for alkyl radicals having more than 23 carbon atoms.

The present invention therefore further provides drilling muds which, in addition to the aqueous phase, comprise as oil phase only those esters of the above general formula whose toxicity, measured by the *Leptocheirus* test, is less than 1 in comparison to the standard IO. The present specification therefore also claims drilling muds comprising an aqueous phase and a non-aqueous oil phase, emulsifiers and, where appropriate, further customary additives, such as weighting agents, fluid loss additives, viscosity regulators, wetting agents, salts, biocides, corrosion inhibitors and/or an alkali reserve, more than 50% by weight of the non-aqueous phase being selected from the group consisting of esters of the general formula R—COO—R' where R stands for a linear or branched, saturated or unsaturated alkyl radical having from 15 to 25 carbon atoms and R' denotes a saturated, linear or branched alkyl radical having from 3 to 10 carbon atoms, the non-aqueous phase having a relative toxicity, i.e. the ratio of the toxicity of internal olefins of chain length C16/C18 (standard IO) to the toxicity of the constituents of the non-aqueous phase, measured in each case in accordance with the *Leptocheirus plumulosus* acute, static 96 hour/10 day sediment toxicity test (in accordance with ASTM E 1367-92 & EPA/600/R-94/025, Section 11), of less than 1.

Besides components a) and/or b) and c) it is possible for the oil phases to include other, water-insoluble constituents, provided that they are environmentally compatible. Specific further particularly suitable mixture components of the oil phases of the invention are therefore:

(i) esters of C1-5 monocarboxylic acids and mono- and/or polyfunctional alcohols, the radicals of monohydric alcohols having at least 6, preferably at least 8, carbon atoms and the polyhydric alcohols possessing from 2 to 6 carbon atoms per molecule, (ii) mixtures of secondary esters selected from the group consisting of propyl carboxylate, butyl carboxylate, pentyl carboxylate, hexyl carboxylate, heptyl carboxylate, octyl carboxylate, nonyl carboxylate, decyl carboxylate, undecyl carboxylate, dodecyl carboxylate, tridecyl carboxylate, tetradecyl carboxylate, pentadecyl carboxylate, hexadecyl carboxylate, heptadecyl carboxylate, octadecyl carboxylate, nonadecyl carboxylate, eicosyl carboxylate, uneicosyl carboxylate, doeicosyl carboxylate and isomers thereof, the secondary esters each having a carboxylate radical of 1 to 5 carbon atoms, (iii) water-insoluble ethers of monohydric alcohols having from 6 to 24 carbon atoms, (iv) water-insoluble alcohols having from 8 to 36 carbon atoms, (v) poly-alpha-olefins (PAO) and alpha-olefins (vi) mixtures of components (I) to (v).

Excluded from use, however, are linear alpha-olefins of chain lengths C14/C16 and also what are termed low toxicity mineral oils, since these do not achieve the desired toxicity levels even when blended, in accordance with the invention, with esters from group c). Likewise excluded is the use of diesel oil. Also excluded, moreover, is the use of methyl esters, since their high toxicity makes them unsuitable for constituting low-toxicity oil phases in the sense of the invention. Under certain conditions, however, the use of such constituents may be necessary—in that case, however, the amounts used are not more than 5% by weight, preferably not more than 2% by weight, based on the oil phase.

As a further mandatory constituent, the compositions of the invention comprise emulsifiers. Their selection depends critically on the type of mud. Emulsifiers which can be used in practice for forming W/O emulsions are, in particular, selected oleophilic fatty acid salts, examples being those based on amido amine compounds. Examples thereof are described in the above-cited U.S. Pat. No. 4,374,737 and the literature cited therein. For preparing W/O emulsions, however, other, preferably nonionic, emulsifiers are used. From the wide range of nonionic emulsifiers, emulsifiers which are particularly suitable in accordance with the invention can be assigned to at least one of the following classes of substance: (oligo)alkoxylates—especially lower alkoxylates, with corresponding ethoxylates and/or propoxylates being of particular significance here—of parent molecules of natural and/or synthetic origin which contain lipophilic radicals and are amenable to alkoxylation. "Lower" in this context denotes from 2 to 15, and in particular from 2 to 10, parts of alkoxide per molecule of emulsifier. Another important class of nonionic emulsifiers for the purposes of the invention are partial esters and/or partial ethers of polyfunctional alcohols having in particular from 2 to 6 carbon atoms and from 2 to 6 OH groups and/or their oligomers with alcohols and/or acids containing lipophilic radicals. Also suitable in particular in this context are compounds of this kind which additionally contain (oligo)alkoxy radicals and, in particular, corresponding oligoethoxy radicals incorporated into their molecular structure. A further example of corresponding emulsifier components are alkyl (poly)glycosides of long-chain alcohols and also the aforementioned fatty alcohols of natural and/or synthetic origin, and alkylolamides, amine oxides and lecithins. With no claim to completeness, mention may be made additionally, from the classes of suitable emulsifiers components cited here, of the following representatives: the (oligo)alkoxylates of parent molecules containing lipophilic radicals may derive in particular from selected representatives of the following classes of parent molecules containing lipophilic radicals: fatty alcohols, fatty acids, fatty amines, fatty amides, fatty acid and/or fatty alcohol esters and/or ethers, alkanolamides, alkylphenols and/or reaction products thereof with formaldehyde, and also further reaction products of carrier molecules containing lipophilic radicals with lower alkoxides. Particular examples of partial esters and/or partial ethers of polyfunctional alcohols are the corresponding partial esters with fatty acids, for example of the type of the glycerol monoesters and/or diesters, glycol monoesters, corresponding partial esters of oligomerised polyfunctional alcohols, sorbitan partial esters and the like, and also corresponding compounds with ether groups.

The oil phases are preferably formed by mixtures of components a) and/or b) with the ester oils c) in a weight ratio of from 10:1 to 1:1, preferably from 5:1 to 1:1 and in particular from 3:1 to 1:1, in order to achieve the desired relative toxicity.

The borehole treatment compositions of the present inventions [sic] are preferably in the form of a water-in-oil (W/O) emulsion, i.e., a homogeneous oil phase encloses the finely disperse aqueous phase. With particular preference, the present compositions of the invention are configured as drilling muds. The compositions of the invention preferably have a weight ratio between the aqueous phase and the oil phase of from 50:50 to 1:99, preferably from 30:70 to 20:80 and in particular 10:90. It is preferred for at least 50% by weight, preferably at least 80% by weight and in particular at least 90% by weight of the oil phase to be composed of compounds a) and/or b) and c). Preference is further given to borehole treatment compositions in which at least 50% by weight, preferably at least 80% by weight and in particular 100% by weight of the oil phase is formed by components a) to c). The percentages by weight here are based on the weight of the oil phase.

It may be advantageous for 100% by weight of the non-aqueous oil phase of the compositions of the invention to be composed of blends of component a) and/or b) and c). It may further be advantageous if only mixtures of a) and c) or, preferably, only b) and c) are present in the oil phases of the compositions of the invention.

The oil phases of the compositions of the invention preferably have pour points of below 0° C., preferably of below −5° C., measured in accordance with DIN ISO 3016: 1982-10). The Brookfield viscosity of the oil phases at 0° C. is not more than 50 mPas. Where they are in the form of an oil-based drilling mud of the W/O type, the borehole treatment compositions of the invention have a plastic viscosity (PV) in the range from 10 to 70 mPas and a yield point (YP) of from 5 to 60 lb/100 ft$^2$, measured in each case at 50° C. The kinematic viscosity of the oil phase, measured by the Ubbelohde method at 20° C., ought preferably to be not more than 12 mm$^2$/s. The aqueous phase of the compositions of the invention preferably has a pH in the range from 7.5 to 12, more preferably from 7.5 to 11 and in particular from 8 to 10.

Besides the constituents set out above, the compositions of the invention further comprise additives, examples being weighting agents, fluid loss additives, viscosity regulators, wetting agents, salts, biocides, corrosion inhibitors and/or an alkali reserve. The general rules governing the composition of the respective treatment fluids apply here, for which exemplary indications are given below with reference to corresponding drilling muds. The additives may be water soluble, oil soluble and/or water-dispersible or oil-dispersible.

Conventional additives may be the following: fluid loss additives, soluble and/or insoluble substances which provide pseudoplasticity, alkali reserves, agents for inhibiting the unwanted exchange of water between drilled formations—e.g. water-swellable clays and/or salt strata—and the drilling fluid which is based for example on water, wetting agents for better attachment of the emulsified oil phase to surfaces of solids, for the purpose of improving the lubricating effect, for example, but also for improving the oleophilic sealing of exposed rock formations or rock faces, biocides, for example for inhibiting the bacterial infestation of W/O emulsions and the like. Merely by way of example mention may be made accordingly of finely disperse additives for increasing the density of the mud: in widespread use is barium sulphate (barytes), although calcium carbonate (calcite) and the mixed carbonate of calcium and magnesium (dolomite) are also in use.

Agents for building up pseudoplasticity, which at the same time also act as fluid loss additives: mention should be made here primarily of bentonite, including hydrophobicized bentonite. For saltwater muds, other, comparable clays, especially attapulgite and sepiolite, are of considerable importance in practice.

The use of organic polymer compounds of natural and/or synthetic origin may also be accorded considerable significance in this context. They include, in particular, starch or chemically modified starches, cellulose derivatives such as carboxymethylcellulose, guar gum, xanthan gum or else purely synthetic, water-soluble and/or water-dispersible polymer compounds, especially those of the type of high molecular mass polyacrylamide compounds with or without anionic and/or cationic modification. Diluents for regulating viscosity: the diluents, as they are known, may be organic or inorganic in nature. Examples of organic diluents are tannins and/or qebracho extract. Further examples thereof are lignite and lignite derivatives, especially lignosulfonates.

As indicated above, however, in one preferred embodiment of the invention the use of toxic components is specifically avoided here, reference here being primarily to the corresponding salts with toxic heavy metals such as chromium and/or copper. An example of inorganic diluents are polyphosphate compounds. Additives which inhibit the unwanted exchange of water with, for example, clays: suitable here are the additives known from the prior art for oil- and water-based drilling muds. These additives include, in particular, halides and/or carbonates of the alkali metals and/or alkaline earth metals, it being possible to accord particular importance to corresponding potassium salts in combination where appropriate with lime.

Alkali reserves: suitable here are organic and/or inorganic bases matched to the overall properties of the mud, especially corresponding basic salts and/or hydroxides of alkali metals and/or alkaline earth metals, and also organic bases. Particular preference here is given to the use of lime (Ca(OH)$_2$) as alkali reserve. Typical levels of lime in the drilling mud are between 1 and 6 lb/bbl, the amounts which can be used depending critically on the nature and composition of the oil phase. The nature and amount of these basic components are preferably chosen and matched to one another such that in the case of esters susceptible to hydrolysis, particularly unsaturated esters with carbon numbers from C16 to C24, excessive hydrolysis does not occur, since the resulting reaction products, especially the fatty acids, may adversely affect the stability of the emulsion drilling mud. It is preferred in these cases to provide an alkali reserve in the mud which corresponds at most to a concentration of 2 lb/bbl of the basic component, preferably lime, in the mud under operation conditions.

In the field of organic bases a terminological distinction is to be made between water-soluble organic bases—for example, compounds of the diethanolamine type—and virtually water-insoluble bases of pronounced oleophilic character. The additional use of such oil-soluble bases is specifically part of the teaching of the present invention. Oleophilic bases of this kind, which are distinguished in particular by at least one relatively long hydrocarbon radical having, for example, from 8 to 36 carbon atoms, are in that case not, however, dissolved in the aqueous phase but rather in the oil phase. Here, multiple significance is accorded to these basic components. On the one hand, they may act directly as an alkali reserve. On the other, they give the dispersed oil droplets a certain positive state of charge and so lead to increased interaction with negative surface charges such as are encountered in particular with hydrophilic clays that are capable of ion exchange. In accordance with the invention it is thereby possible to exert influence on the hydrolytic cleavage and the oleophilic sealing of water-reactive rock strata. The amount of the auxiliaries and additives employed in each case is fundamentally within customary ranges and can therefore be taken from the relevant cited literature.

The use of the esters of group c) in a blend with component a) and/or b) means that it is possible to obtain oil phases which are of low relative toxicity towards the marine microbiont *Leptocheirus plumulosus*. In addition, however, the addition of esters of the general formula R—COO—R' in which R stands for a linear or branched, saturated or unsaturated alkyl radical having from 15 to 25 carbon atoms and R' denotes a saturated, linear or branched alkyl radical having from 3 to 10 carbon atoms markedly improves the lubricating properties of drilling muds comprising an aqueous phase and a non-aqueous phase, emulsifiers and, where appropriate, further customary additives, such as weighting agents, fluid loss additives, viscosity regulators, wetting agents, salts, biocides, corrosion inhibitors and/or an alkali reserve. It is preferred to use between 5 and 15% by weight, in particular from 8 to 12% by weight, of these esters in the oil phase in order to obtain the desired lubricating effect.

Furthermore, it is possible by adding the esters of the general formula R—COO—R' in which R stands for a linear or branched, saturated or unsaturated alkyl radical having from 15 to 25 carbons and R' denotes a saturated, linear or branched alkyl radical having from 3 to 10 carbon atoms to oil phases of customary drilling muds to reduce the use of structuring agents, preferably products based on clays with or without chemical or physical modification, e.g., bentonites. For details, refer to the relevant literature, in this case, for example, the Manual of Drilling Fluid Technology, NL Baroid, 1979, Chapter on "Fundamental Characteristics of Drilling Fluids" and in particular the disclosure content of pages 5 to 8. Accordingly, considerable cost advantages arise as compared with prior art muds. The amounts in which the inventively used esters are employed are between 15 and 100% by weight, preferably between 25 and 100% by weight and in particular from 50 to 100% by weight, based on the amount of the oil phase. By means of the oil phases of the invention it is possible to achieve marked reductions in the fraction of clay-based structuring agents. It is even possible to formulate clay-free muds. The esters are preferably used in the context of the invention for emulsion drilling muds of the invert type, i.e. W/O.

EXAMPLES

Set out below are examples of the low-toxicity drilling muds of the invention. Four different muds were produced, based on the following framework formula:

| | |
|---|---|
| Oil phase | 0.567 bbl |
| Water | 0.148 bbl |
| Organophilic bentonite | 2.0 bbl Geltone, from Baroid |
| Emulsifier | 8.0 bbl (EZ-Mul NTE from Baroid) |
| Fluid loss additive | 8.00 bbl (Duratone HT, from Baroid) |
| Lime | 1.0 bbl |
| $CaCl_2 \cdot 2H_2O$ | 18.0 bbl |
| Barytes | 326.1 bbl |
| Oil/water ratio: 80/20 | |

Example 1

For Example 1 the oil phase used was a mixture (50:50 w/w) of 0.284 bbl of an IO mixture comprising C16/C18 IOs and a saturated monocarboxylic ester based on monocarboxylic acids having 20 to 22 carbon atoms and 2-ethylhexanol (OMC 586 from Cognis). The F value was 0.87.

The tables below list the rheological characteristics in each case before and after ageing of the muds at 250° F. for 16 h. The rheological data were in each case measured in accordance with API bulletin RP 13 B-2.

| | Unaged | Aged | |
|---|---|---|---|
| Plastic viscosity (PV) | 25 | 25 | cP |
| Yield point (YP) | 17 | 14 | lb/100 ft² |
| Gel strength 10 s/10 min. | 7/8 | 6/6 | lb/100 ft² |

Comparative Example 1

The mud of the Comparative Example contained in the oil phase only an IO mixture based on C16/C18 IOs. The F value, however, was 2.7.

| | Unaged | Aged | |
|---|---|---|---|
| Plastic viscosity (PV) | 28 | 20 | cP |
| Yield point (YP) | 14 | 5 | lb/100 ft² |
| Gel strength 10 s/10 min. | 6/7 | 4/6 | lb/100 ft² |

It was found that the use of ester/paraffin mixtures allows low-toxicity drilling muds to be produced without any restriction on the service properties.

Example 2

For Example 2 a mud in analogy to Example 1 was used, but the content of the fluid loss additive was reduced to 4 lb. The F value was 0.87.

| | Unaged | Aged | |
|---|---|---|---|
| Plastic viscosity (PV) | 22 | 21 | cP |
| Yield point (YP) | 11 | 12 | lb/100 ft² |
| Gel strength 10 s/10 min. | 5/6 | 5/7 | lb/100 ft² |

Comparative Example 2

Again, the Comparative Example used was a mud with exclusively IO in the oil phase.

| | Unaged | Aged | |
|---|---|---|---|
| Plastic viscosity (PV) | 17 | 18 | cP |
| Yield point (YP) | 6 | 11 | lb/100 ft² |
| Gel strength 10 s/10 min. | 3/4 | 3/4 | lb/100 ft² |

Example 3

The following compilation shows the comparison of oil phases based on paraffin with an oil phase based on a 1:1 paraffin/ester mixture (Ester: OMC586). The paraffin was Puredrill IA-35 from Petro Canada. The remaining constituents of the mud were in accordance with the outline formula given above.

Examples After Ageing (16 h, 250° F.), Oil/Water: 80/20:

| | Paraffin | Paraffin Ester 1:1 | Paraffin | Paraffin Ester 1:1 | Paraffin | Paraffin Ester 1:1 | Paraffin | Paraffin Ester 1:1 |
|---|---|---|---|---|---|---|---|---|
| Geltone lb/bbl | 0 | 0 | 0.5 | 0.5 | 1 | 1 | 2 | 2 |
| PV | 20 | 20 | 18 | 20 | 20 | 22 | 22 | 25 |
| YP | 2 | 10 | 3 | 14 | 3 | 11 | 3 | 12 |

Examples (Before Ageing)

|  | Paraffin | Paraffin Ester 1:1 | Paraffin | Paraffin Ester 1:1 | Paraffin | Paraffin Ester 1:1 |
|---|---|---|---|---|---|---|
| Geltone lb/bbl | 0 | 0 | 1 | 1 | 2 | 2 |
| PV | 18 | 23 | 19 | 22 | 23 | 27 |
| YP | 2 | 15 | 4 | 17 | 4 | 17 |

As is evident from the above results, it is possible to formulate systems based on paraffin/ester mixtures which have a greatly reduced Geltone content. Attempts to achieve such effects using mixtures of different aromatics-free/low-aromatics hydrocarbons were unsuccessful.

Another important criterion is the base viscosity of oil phases. Here, measurement is carried out by the Ubbelohde method at 20° C. using the capillary factors c=0.009987, c=0.009933, c=0.029. The kinematic viscosity is given by the formula $v=\Delta t \times c$. Ester based in each case on 2-ethylhexanol.

Examples

| $C_{16/18}$ IO + $C_{20-22}$ esters | 1:1 | 6.1 mm²/s |
|---|---|---|
| Branched paraffin + $C_{15-17}$ esters | 1:1 | 4.9 mm²/s |
| Branched paraffin + $C_{20-22}$ esters | 1:1 | 7.2 mm²/s |
| Branched paraffin + $C_{15-17}$ ester + $C_{24-26}$ ester | 1:1:0.5 | 6.1 mm²/s |
| Branched paraffin + $C_{24-26}$ + $C_{24-26}$ esters | 1:1 | 9.3 mm²/s |

We claim:

1. A borehole treatment composition comprising: an aqueous phase; a non-aqueous oil phase; emulsifiers; and, optionally, further additives, including weighting agents, fluid loss additives, viscosity regulators, wetting agents, salts, biocides, corrosion inhibitors and an alkali reserve;
wherein said non-aqueous oil phase comprises an admixture of a) and c), b) and c), or a) and b) and c);
wherein:
a) paraffins having from 5 to 22 carbon atoms;
b) internal olefins having from 12 to 30 carbon atoms in the molecule; and
c) carboxylic acid esters of the formula R—COO—R', where R stands for a linear or branched, saturated or unsaturated alkyl radical having from 15 to 25 carbon atoms and R' denotes a saturated, linear or branched alkyl radical having from 3 to 22 carbon atoms; wherein, the ratio of the toxicity of internal olefins of chain length $C_{16-18}$ to the toxicity of the non-aqueous oil phase, in each case as measured by the *Leptocheirus plumulosus* acute, static 96 hour/10 day sediment toxicity test in accordance with ASTM E 1367-92 & EPA/600/R-94/025, Section 11, is less than 1.

2. The borehole treatment composition of claim 1, in the form of a water-in-oil emulsion.

3. A drilling mud comprising the borehole treatment composition of claim 1.

4. The borehole treatment composition of claim 1, wherein, the weight ratio of the aqueous phase to the non-aqueous oil phase is from 50:50 to 1:99.

5. The borehole treatment composition of claim 1, wherein, component a) comprises at least one member selected from the group consisting of linear and branched paraffins having from 10 to 21 carbon atoms.

6. The borehole treatment composition of claim 1, wherein, component b) comprises at least one member selected from the group consisting of internal olefins having from 14 to 24 carbon atoms.

7. The borehole treatment composition of claim 1, wherein, component c) comprises esters of the formula R—COO—R' in which R stands for saturated or unsaturated linear alkyl radicals having from 15 to 23 carbon atoms and R' denotes a linear or branched saturated alkyl radical having from 6 to 22 carbon atoms.

8. The borehole treatment composition of claim 1, wherein, in addition to the esters, the composition comprises not more than 15% by weight, based on the oil phase, of esters with radicals R having more than 23 carbon atoms.

9. The borehole treatment composition of claim 1, wherein said non-aqueous oil phase further comprises:
environmentally compatible, water-insoluble components.

10. The borehole treatment composition of claim 1 further comprising esters of C1-C5 monocarboxylic acids with monofunctional and/or polyfunctional alcohols, the mono functional alcohols having at least 6 carbon atoms and the polyfunctional alcohols having from 2 to 6 carbon atoms per molecule.

11. The borehole treatment composition of claim 1, wherein, the non-aqueous oil phase further comprises at least one secondary ester selected from the group consisting of propyl carboxylate, butyl carboxylate, pentyl carboxylate, hexyl carboxylate, heptyl carboxylate, octyl carboxylate, nonyl carboxylate, decyl carboxylate, undecyl carboxylate, dodecyl carboxylate, tridecyl carboxylate, tetradecyl carboxylate, pentadecyl carboxylate, hexadecyl carboxylate, heptadecyl carboxylate, octadecyl carboxylate, nonadecyl carboxylate, eicosyl carboxylate, uneicosyl carboxylate, doeicosyl carboxylate and isomers thereof, wherein the secondary esters each have a carboxylate group of 1 to 5 carbon atoms.

12. The borehole treatment composition of claim 1, wherein, the non-aqueous oil phase has a pour point of below 0° C.

13. The borehole treatment composition of claim 1 in the form of an oil-based drilling mud of the water-in-oil type having a plastic viscosity (PV) in the range from 10 to 70 mPas and a yield point (YP) from 5 to 60 lb/100 ft², measured in each case at 50° C., wherein, the non-aqueous oil phase has a Brookfield viscosity at 0° C. of not more than 50 mPas.

14. The composition of claim 1 in the form of an oil-based drilling mud of the water-in-oil type; the drilling mud having a plastic viscosity (PV) in the range from 10 to 60 mPas and a yield point (YP) from 5 to 40 lb/100 ft², measured in each case at 50° C.

15. The borehole treatment composition of claim 1, wherein, the oil phase has an Ubbelohde viscosity at 20° C. of not more than 12 mm²/s.

16. The borehole treatment composition of claim 1, wherein, the aqueous phase has a pH in the range from 7.5 to 11.

17. The borehole treatment composition of claim 1, wherein, the non-aqueous oil phase comprises blends of components a) and c) in a weight ratio the sum of a) and b) toe) of from 10:1 to 1:1.

18. The borehole treatment composition of claim 1 comprising a non-aqueous oil phase component b) having a relative toxicity in relation to standard IOs of chain length $C_{16-18}$ greater than 1, wherein, c) is present in the non-aqueous oil phase to reduce the relative toxicity.

19. The borehole treatment composition of claim 1 in the form of an invert drilling mud with low toxicity.

20. The borehole treatment composition of claim 1, said non-aqueous oil phase further comprising organophilic clay.

21. The borehole treatment composition of claim 1, wherein said carboxylic acid esters of the formula R—COO—R', include a total of from about 20 to about 22 carbon atoms.

22. A borehole treatment composition comprising: an aqueous phase; a non-aqueous oil phase; emulsifiers; and, optionally, further additives, including weighting agents, fluid loss additives, viscosity regulators, wetting agents, salts, biocides, corrosion inhibitors and an alkali reserve;

wherein said non-aqueous oil phase comprises an admixture of a) and c), b) and c), or a) and b) and c);

wherein:
a) paraffins having from 5 to 22 carbon atoms;
b) internal olefins having from 12 to 30 carbon atoms in the molecule; and
c) $C_{8-14}$ fatty acid ester of 2-ethylhexanol;
wherein the ratio of the toxicity of internal olefins of chain length $C_{16-18}$ to the toxicity of said non-aqueous oil phase, in each case as measured by the *Leptocheirus plumulosus* acute, static 96 hour/10 day sediment toxicity test in accordance with ASTM E 1367-92 & EPA/600/R-94/025, Section 11, is less than 1.

* * * * *

UNITED STATES PATENT AND TRADEMARK OFFICE
CERTIFICATE OF CORRECTION

PATENT NO. : 7,666,820 B2
APPLICATION NO. : 10/527212
DATED : February 23, 2010
INVENTOR(S) : Heinz Mueller, Nadja Herzog and Stephan Von Tapavicza It is certified that error appears in the above-identified patent and that said Letters Patent is hereby corrected as shown below:

Column 5,
Line 45, "components (I) to (v)" should read -- components (i) to (v) --.

Column 12 Claim 10,
Lines 20-21, "the mono functional alcohols" should read -- the monofunctional alcohols --.

Line 59, "a) and b) toe)" should read -- a) and b) to c) --.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,666,820 B2  Page 1 of 1
APPLICATION NO. : 10/527212
DATED : February 23, 2010
INVENTOR(S) : Mueller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Seventh Day of December, 2010

David J. Kappos
*Director of the United States Patent and Trademark Office*